(12) United States Patent
Shew et al.

(10) Patent No.: US 7,711,828 B2
(45) Date of Patent: May 4, 2010

(54) COMMUNICATION BETWEEN CALL CONTROLLERS BY AMENDING CALL PROCESSING MESSAGES

(75) Inventors: Stephen D. Shew, Kanata (CA); Malcolm Betts, Kanata (CA); Erning E. Ye, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 936 days.

(21) Appl. No.: 11/486,485

(22) Filed: Jul. 14, 2006

(65) Prior Publication Data
US 2006/0259630 A1 Nov. 16, 2006

Related U.S. Application Data

(62) Division of application No. 10/170,701, filed on Jun. 14, 2002.

(51) Int. Cl.
*G06F 15/16* (2006.01)
(52) U.S. Cl. .......... 709/227; 709/228; 709/229; 709/238; 709/239; 709/206; 455/560; 455/406; 455/411; 455/445
(58) Field of Classification Search ......... 709/227–229, 709/206, 238, 207, 239
See application file for complete search history.

(56) References Cited

U.S. PATENT DOCUMENTS

| | | | |
|---|---|---|---|
| 5,841,771 A | 11/1998 | Irwin | |
| 5,974,142 A * | 10/1999 | Heer et al. | 379/442 |
| 6,047,325 A | 4/2000 | Jain et al. | |
| 6,563,798 B1 | 5/2003 | Cheng | |
| 6,564,261 B1 | 5/2003 | Gudjonsson et al. | |
| 6,580,721 B1 | 6/2003 | Beshai | |
| 6,611,519 B1 | 8/2003 | Howe | |
| 6,636,484 B1 | 10/2003 | Agrawal | |
| 6,711,171 B1 | 3/2004 | Dobbins et al. | |
| 6,813,242 B1 | 11/2004 | Haskin | |
| 6,857,072 B1 | 2/2005 | Schuster et al. | |
| 2003/0074413 A1* | 4/2003 | Nielsen et al. | 709/206 |
| 2003/0088698 A1 | 5/2003 | Singh et al. | |

* cited by examiner

*Primary Examiner*—Jude J Jean Gilles
(74) *Attorney, Agent, or Firm*—Anderson Gorecki & Manaras LLP

(57) ABSTRACT

Call Control entities in a network communicate between themselves by amending call processing messages to include encrypted network information. As such, a call may be established whose path through the network is dependent on the paths of other calls. Information of a scope larger than a Call Controller normally possesses can, as a result of this communication, be made available to Call Controllers for constraining call establishment. This information could relate to other calls and connections associated with those other calls. The information may also relate to gateways in and to adjacent networks and the Call Controllers in the adjacent networks that are related to the current Call Controller.

28 Claims, 7 Drawing Sheets

COMMUNICATION BETWEEN CALL CONTROLLERS BY AMENDING CALL PROCESSING MESSAGES

CROSS-REFERENCE TO RELATED APPLICATIONS

This application claims priority to and is a divisional of U.S. patent application Ser. No. 10/170,701 filed Jun. 14, 2002, the content of which is hereby incorporated herein by reference.

FIELD OF THE INVENTION

The present invention relates to call controllers in communication networks and, more particularly, communication between call controllers by amending call processing messages.

BACKGROUND

Users of connection-oriented communications networks, of the type typically used to connect telephones or computers, communicate by first establishing a "call". A call represents an agreement to communicate over a particular path, where a path is a series of links between network entities. From a network management perspective, each call is a billable entity. Call establishment and teardown is typically implemented through the use of a "call" protocol that is used for communication between an entity representative of a user and an entity representative of a network through which the call is to be established. The call protocol may also be used for communication between entities within networks and between entities in separate networks. A "connection" may be considered the actual "pipe" over which user communication flows. Once a call is established or while a call is being established, a connection may be established and associated with that call. In general, there may be zero or more connections associated with a single call. One of the important functions of the call protocols is the initiation and management of "connection establishment" protocols.

A Call Controller is a call control entity that is used to initiate, terminate and transit call actions. The Call Controller enables the establishment, release, modification and maintenance of individual calls or sets of calls. When in use by a user, the Call Controller is known as a "Client" Call Controller. When in use at a network edge and a border between networks, the Call Controller is known as a "Network" Call Controller. Many Call Controllers are involved in a single call. The Call Controllers that are involved in the same call communicate with each other, using a predetermined protocol, to control and maintain the connections associated with the call. Typically, call control entities that are not involved in the same call do not communicate with each other in connection-oriented networks.

To establish a call, a Client Call Controller communicates with a Network Call Controller (a source network entity) to indicate a requirement for a call and a destination for the required call. This requirement is often indicated through the use of a "call request" message, which is part of a protocol that defines standard call processing messages. In typical connection-oriented networks with distributed call and connection control, such as described above, a path is computed, by the Network Call Controller that received the call request message from the Client Call Controller, for the required call without consideration of information relating to other, previously established, calls in the network. While information relating to calls that originate from a given Network Call Controller is available to the given Network Call Controller while calculating a path for a new call, information relating to calls that originate from other Network Call Controllers is not available to the given Network Call Controller.

It has been suggested that additional information, of a scope larger than the given Network Call Controller normally processes, should be made available to the given Network Call Controller in order to constrain call establishment. Where properly constrained calls are established, it is suggested that the connection-oriented network involved will operate more efficiently.

This additional information could include information relating to other calls and the connections associated with those other calls. The additional information could also include information relating to gateways to adjacent networks and the call controllers in adjacent networks that may be associated with specific Client Call Controllers.

One approach for providing additional information involves allowing a Client Call Controller to query a first Network Call Controller for information relating to a first call established through communication with the first Network Call Controller. It would then be expected that the first Network Call Controller would release this information to the querying Client Call Controller. The information may then be used by the Client Call Controller when sending a call request message, for a second call, to a second Network Call Controller. The Client Call Controller may pass the information to the second Network Call Controller in order that the second call may be constrained by the information passed about the first call.

The problem with this approach is that the first Network Call Controller could disclose, to the Client Call Controller, some network information that should remain confidential. Typically, the relationship between users (Client Call Controllers) and networks (Network Call Controllers) is considered to be an "untrusted" relationship. In this approach, wherein a Client Call Controller can learn network information about a call through a query, the untrusted nature of the user-network relationship is broken. That is, a first entity is sending information to a second entity that the first entity would not normally send, due to the nature of the relationship between the two entities.

A second approach involves the introduction of a global call identifier that can be accessed by more than one source network entities, that is, Network Call Controllers that will be establishing calls in the future. Where a source Client Call Controller has requested, of a first Network Call Controller, that a first call be established to a destination, the established call is given a global call identifier, which is disclosed to the source Client Call Controller. Further, network information about the first call may be maintained at a central entity in the network. The source Client Call Controller may then use the global call identifier of the first call when requesting, of a second Network Call Controller, that a second call be established to the same destination, where the path of the second call is to be diverse from the path of the first call. A path may be considered diverse relative to another path if the two paths do not have any path segments in common. Additionally, a path may be considered diverse relative to another path if the two paths do not have any intermediate path segment end points (nodes) in common. However, this approach is not always efficient. A path for the second call might never be found, since availability of alternate paths is not considered at the time of establishment of the first call. Furthermore, the central entity may be required to retain information relating to calls and connections associated with those calls in a network and between networks. Without a centralized call/connection database, path computation may occur without information relating to path segments or intermediate path segment end points to avoid. Only when the path computation process encounters a node acting as an end of a path segment in use by a call having the global call identifier of the first call, can path computation know to try a path that does not include that path segment or intermediate point. Unfortunately, neither approach, i.e., the centralized call/connection database approach and the approach without a database, may be performed with speed sufficient to meet various path computation guidelines, even in a single network.

A third approach involves creating a separate method, strictly for inter-Call Controller communication. However, inter-Call Controller communication usually piggybacks on connection control communication and it is preferred that Call Controllers be able to communicate with each other in the absence of previously established calls. Additionally, Call Controllers in different networks may have difficulty communicating given that there may be no shared signaling network between those networks.

Clearly, a need exists for Call Controllers to communicate in a manner that provides the Call Controllers with additional network information, yet avoids revealing network information to the user and avoids use of direct communications between Call Controllers that is separate from existing communications.

SUMMARY

Call Control entities in a network communicate between themselves by amending call processing messages to include network information. As such, a call may be established whose path through the network is dependent on the paths of other calls. Information of a scope larger than a Call Controller normally possesses can, as a result of this communication, be made available to Call Controllers for constraining call establishment. This information could relate to other calls and connections associated with those other calls. The information may also relate to gateways in adjacent networks and the Call Controllers in the adjacent networks that are related to the current Call Controller.

Advantageously, in preferred aspects of the present invention, trusted network information is not disclosed to entities outside of the network as a result of the communication between the Call Controllers. In one aspect of the present invention, disclosure of trusted network information is avoided through the use of encryption. Furthermore, a separate method for inter-Call Controller communication is avoided.

In accordance with an aspect of the present invention there is provided, in a connection-oriented network including a plurality of interconnected call controllers, a method of optimally establishing multiple calls between a source client call controller and a destination client call controller. The method includes receiving a call processing message, amending the call processing message to include encrypted network information, resulting in an amended call processing message and sending the amended call processing message to one of the plurality of interconnected call controllers. In other aspects of the invention, a call controller is provided adapted to perform this method and a computer readable medium is provided to allow a general purpose computer to perform this method.

In accordance with another aspect of the present invention there is provided a method of, at a client call controller, requesting the establishment of a second call from a source to a destination, where a path for the second call uses path segments distinct from path segments used in a previously determined path for a first call. The method includes, responsive to receiving a call processing message, where the call processing message includes encrypted network information, sending a message, to a network call controller, requesting establishment of the second call, where the message includes the encrypted network information. In other aspects of the invention, a client call controller is provided adapted to perform this method and a computer readable medium is provided to allow a general purpose computer to perform this method.

In accordance with a further aspect of the present invention there is provided, at a source client call controller connected to a connection-oriented network including a plurality of interconnected network call controllers, a method of requesting the establishment of a given call to a destination client call controller. The method includes receiving a notification, from a first network call controller, that a first call request message has been rejected, where the notification includes encrypted network information related to a path to be used by the given call and non-encrypted network information, selecting a second network call controller based on the non-encrypted network information and, responsive to the receiving the notification, sending a second call request message, to the second network call controller, requesting establishment of the given call, where the second call request message includes the encrypted network information. In other aspects of the invention, a client call controller is provided adapted to perform this method and a computer readable medium is provided to allow a general purpose computer to perform this method.

In accordance with an again further aspect of the present invention there is provided a network call controller in a connection-oriented network including a plurality of interconnected network call controllers, a method of call processing. The method includes a step for receiving a call request message requesting establishment of a given call to a specified destination, a step for, responsive to the receiving, determining a path to a client call controller connected to the specified destination and a step for amending the call request message to include encrypted information relating to the path to result in an amended call request message. In other aspects of the invention, a network call controller is provided adapted to perform this method and a computer readable medium is provided to allow a general purpose computer to perform this method.

In accordance with still another aspect of the present invention there is provided, at a network call controller in a connection-oriented network including a plurality of interconnected network call controllers, a method of call processing. The method includes receiving a call request message requesting establishment of a given call to a specified destination, responsive to the receiving, determining a path to a client call controller connected to the specified destination and amending the call request message to include encrypted information relating to the path to result in an amended call request message. In other aspects of the invention, a network call controller is provided adapted to perform this method and a computer readable medium is provided to allow a general purpose computer to perform this method.

In accordance with an even further aspect of the present invention there is provided, in a connection-oriented network including a plurality of interconnected network call controllers, a method of call processing at a network call controller. The method includes receiving a call request message requesting establishment of a given call to a specified destination, responsive to the receiving, determining a path to a network call controller that acts as a gateway to a network having a connection to the specified destination and amending the call request message to include information relating to the path to result in an amended call request message. In other aspects of the invention, a network call controller is provided adapted to perform this method and a computer readable medium is provided to allow a general purpose computer to perform this method.

In accordance with a still further aspect of the present invention there is provided, at a network call controller in a connection-oriented network including a plurality of interconnected network call controllers, a method of call processing. The method includes receiving a call request message requesting establishment of a given call to a specified destination, responsive to the receiving, decrypting call path information included in the call request message and further processing the given call based on the decrypted call path information. In other aspects of the invention, a network call controller is provided adapted to perform this method and a computer readable medium is provided to allow a general purpose computer to perform this method.

In accordance with a still further aspect of the present invention there is provided, at a client call controller connected to a connection-oriented network including a plurality of interconnected network call controllers, a method of using information about a first call when requesting a second call. The method includes sending a query to a network call controller, the query requesting information about the first call, receiving the information in encrypted form and sending a call request message for the second call to a network call controller, where the call request message includes the encrypted information. In other aspects of the invention, a client call controller is provided adapted to perform this method and a computer readable medium is provided to allow a general purpose computer to perform this method.

In accordance with a still further aspect of the present invention there is provided, at a network call controller in a connection-oriented network including a plurality of interconnected network call controllers, a method of message processing. The method includes receiving a query that requests information about a first call and sending the information, to a source of the query, in encrypted form. In other aspects of the invention, a network call controller is provided adapted to perform this method and a computer readable medium is provided to allow a general purpose computer to perform this method.

In accordance with a still further aspect of the present invention there is provided, at a client call controller connected to a connection-oriented network including a plurality of interconnected network call controllers, a method of requesting a call. The method includes sending a call request message to a network call controller in the connection-oriented network over a first user to network interface and including, in the call request message, an identifier of a second user to network interface connecting the client call controller to the connection-oriented network.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
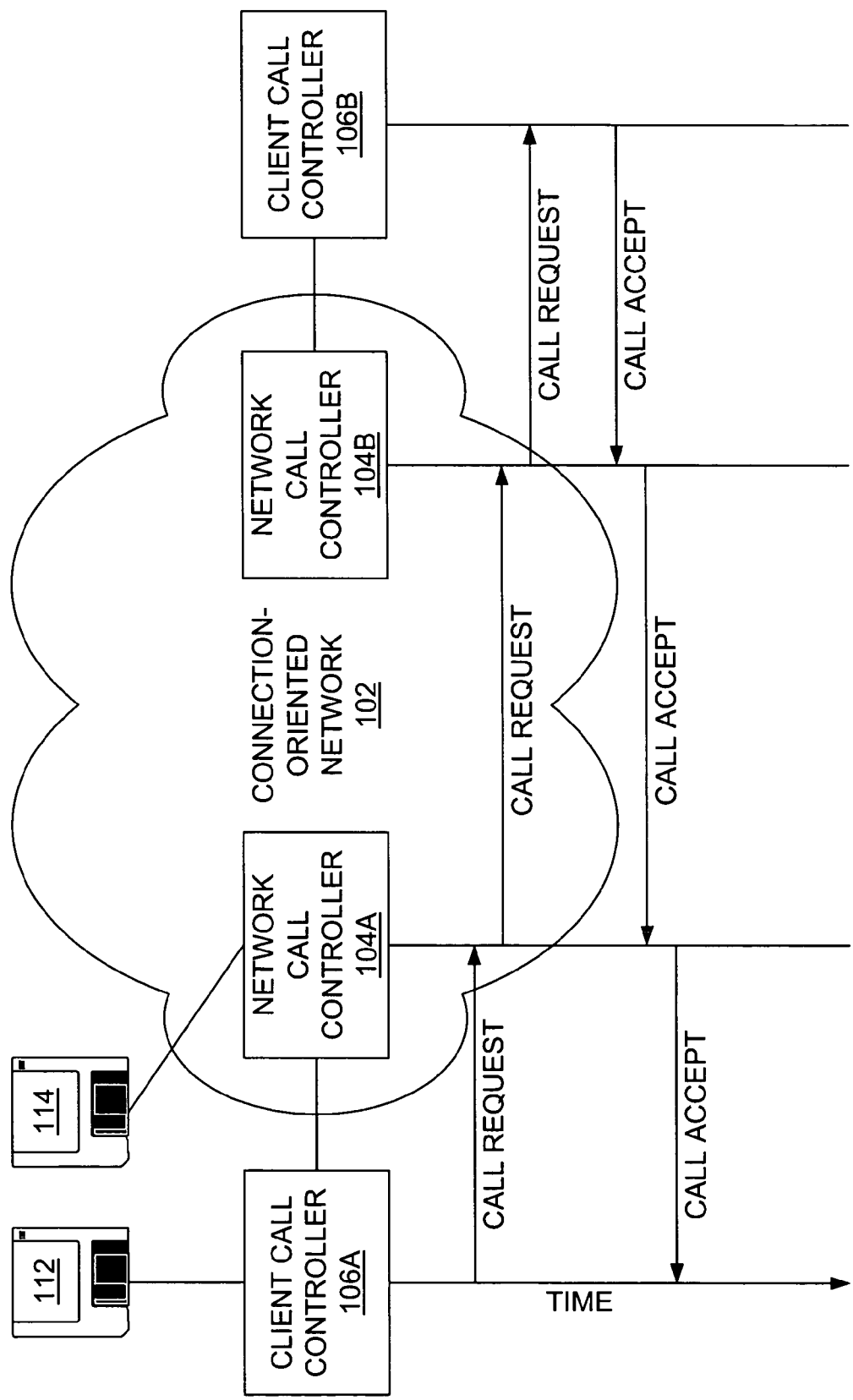
FIG. 1 illustrates a connection-oriented network connecting a source to a destination and typical signal flow associated with a basic procedure to establish a call from the source to the destination.

FIG. 1 illustrates typical signal flow associated with a basic call establishment procedure. A connection-oriented network 102 is shown to include a source Network Call Controller 104A and a destination Network Call Controller 104B. In communication with the source Network Call Controller 104A is a source Client Call Controller 106A. In communication with the destination Network Call Controller 104B is a destination Client Call Controller 106B. The internal connectivity within the connection-oriented network 102 is not shown.

The call establishment procedure may be initiated when a call request message is sent from the source Client Call Controller 106A to the source Network Call Controller 104A at the "calling edge" of the connection-oriented network 102. The source Network Call Controller 104A computes a path through the connection-oriented network 102 to the destination Network Call Controller 104B at the "called edge" of the connection-oriented network 102. A call may then be established, using the computed path, through the connection-oriented network 102 from the source Network Call Controller 104A to the destination Network Call Controller 104B at the "called edge" of the connection-oriented network 102. A connection may be established at the same time. Finally, the call request message may be sent from the destination Network Call Controller 104B to the destination Client Call Controller 106B. Provided that the destination Client Call Controller 106B accepts the call request message after validation, a "call accept" message may be sent to the destination Network Call Controller 104B, from which the call accept message may be sent, using the established connection over the computed path, to the source Network Call Controller 104A. Lastly, the call accept message may be sent from the source Network Call Controller 104A to the source Client Call Controller 106A to confirm the connection from the connection-oriented network 102 to the source Client Call Controller 106A and also to indicate the completion of call establishment. There are similar procedures for call release and call modification.

A processor (see FIG. 7) in the source Client Call Controller 106A and a processor (see FIG. 7) in the source Network Call Controller 104A may be loaded with a call processing software for executing methods exemplary of this invention from a software medium 112 and a software medium 114, respectively. The software medium 112 and the software medium 114 may take the form of disk, tape, chip or random access memory containing a file downloaded from a remote source.

Within a connection-oriented network, there may be three reference points, namely a User-Network Interface (UNI), an Internal Network-Network Interface (I-NNI) and an External Network-Network Interface (E-NNI). Information flows for various call processing functions occur over these reference points. These call processing functions include call control, connection control and routing. Standards for UNI, I-NNI and E-NNI are defined in International Telecommunication Union Telecommunication Standardization Sector (ITU-T) Recommendation G.8080/Y.1304 (11/01) "Architecture for the Automatically Switched Optical Network (ASON)".

Figure 2:
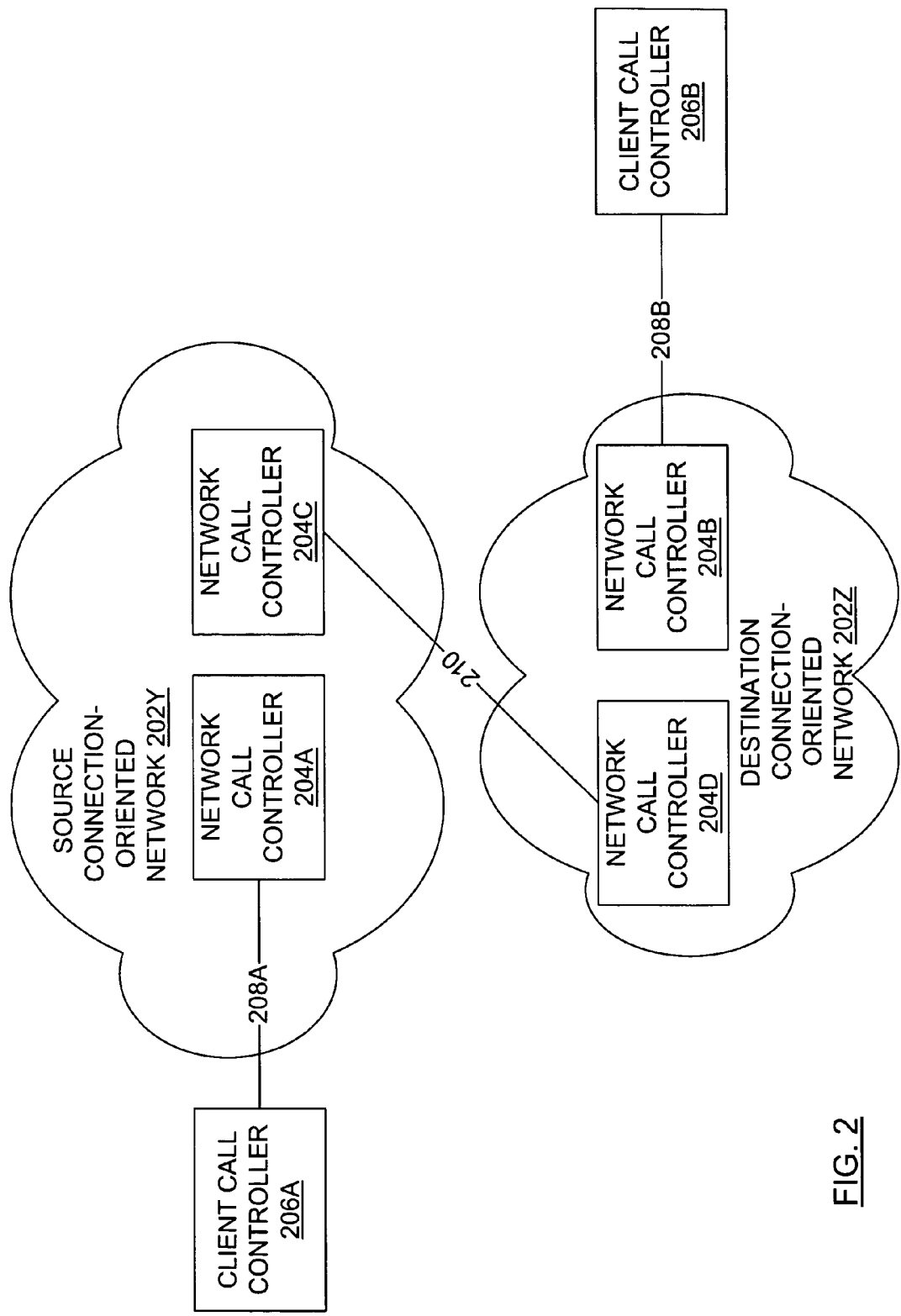
FIG. 2 illustrates two connection-oriented networks connecting a source to a destination and may be used for a discussion of network reference points.

The three reference points may be considered in view of FIG. 2. A source Client Call Controller 206A communicates with a source Network Call Controller 204A over a source UNI 208A. At the source UNI 208A reference point, information flows between the source Client Call Controller 206A and the source Network Call Controller 204A. Additionally, a destination Client Call Controller 206B communicates with a destination Network Call Controller 204B over a destination UNI 208B. However, the source Network Call Controller 204A is part of a source connection-oriented network 202Y and the destination Network Call Controller 204B is part of a destination connection-oriented network 202Z. Consequently, the source Network Call Controller 204A must communicate with an egress gateway Network Call Controller 204C. Within the source connection-oriented network 202Y, the source Network Call Controller 204A may communicate with the egress gateway Network Call Controller 204C using an I-NNI. The internal connectivity within the source connection-oriented network 202Y is not shown. The egress gateway Network Call Controller 204C communicates with an ingress gateway Network Call Controller 204D, which is part of the destination connection-oriented network 202Z, over an E-NNI 210. An E-NNI is used between networks, and there may be multiple E-NNIs between a given pair of networks. At the E-NNI 210, information flows between the egress gateway Network Call Controller 204C and the ingress gateway Network Call Controller 204D. The ingress gateway Network Call Controller 204D may then communicate with the destination Network Call Controller 204B using an I-NNI. The internal connectivity within the destination connection-oriented network 202Z is not shown.

Rather than computing a path to the destination Network Call Controller 204B upon receipt of a call request message from the source Client Call Controller 206A that specifies the destination Client Call Controller 206B, the source Network Call Controller 204A computes a path to the egress gateway Network Call Controller 204C. It is the ingress gateway Network Call Controller 204D that computes a path to the destination Network Call Controller 204B.

In general, the source Client Call Controller 206A should have an awareness of the identifiers of the local UNIs (as there may be more than one) connected to itself and the remote UNIs connected to the destination Client Call Controller 206B. The above-mentioned "identifier" of UNI may be a public network address, e.g., a Transport Network Assigned (TNA) address as suggested by the Optical Internetworking Forum (OIF) in the "User Network Interface (UNI) 1.0 Signaling Specification". In the OIF specification, each TNA address is a globally unique address assigned by a transport network to one or more data bearing links.

Additionally, each Network Call Controller in a given network should maintain a record of the identifiers of the E-NNI gateways located in the given network, or at least have a capability to learn the identifiers from a network entity that maintains such information. Further, E-NNI gateways (e.g., egress gateway Network Call Controller 204C, ingress gateway Network Call Controller 204D) should maintain a record of the identifiers of peer gateways that are located in neighbor networks, or at least have a capability to learn the identifiers from a network entity that maintains such information. The identifier of an E-NNI gateway is a public network address. Each Network Call Controller in a given network should also maintain a record of the identifiers of any neighbor networks, or at least have a capability to learn the identifiers from a network entity that maintains such information. The identifier of a network is a public network identity such as a carrier ID or an Autonomous System (AS) number. As well, each Network Call Controller in a given network should support address resolution capable of translating the various public addresses to switch addresses that are internal to the given network.

An individual Client Call Controller may connect to the same connection-oriented network over more than one UNI and this is known as "dual homing". An individual Client Call Controller could also connect over UNIs to two different connection-oriented networks. This is also a form of dual homing. Dual homing may be used to increase the reliability of a client's service to a network. Despite the name, dual homing may involve more than two UNIs to different edge Network Call Controllers. Between networks, multiple E-NNIs may also be used to increase reliability.

Figure 3:
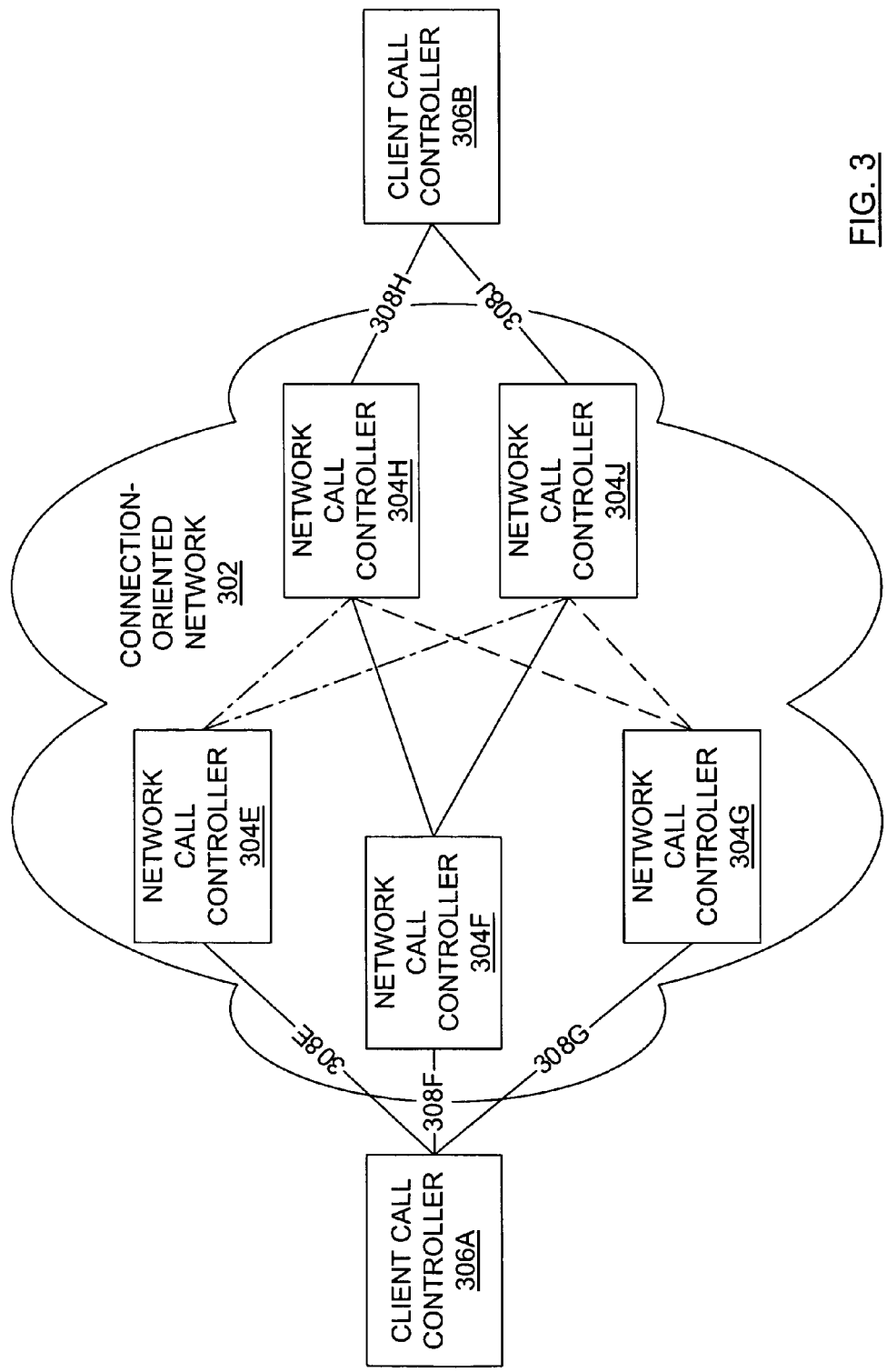
FIG. 3 illustrates a connection-oriented network connecting a source to a destination and may be used for a discussion of an "Optimal Path" implementation of dual homing.

FIG. 3 illustrates an example of dual homing. In the "Optimal Path" example of FIG. 3, a source Client Call Controller 306A may communicate with a connection-oriented network 302 over any one of three UNIs 308E, 308F, 308G to a corresponding Network Call Controller 304E, 304F, 304G (referenced herein individually or collectively as 304). On the destination end, a destination Client Call Controller 306B may communicate with the connection-oriented network 302 over one of two UNIs 308H, 308J to a corresponding Network Call Controller 304H, 304J. The source Client Call Controller 306A sends a call request message to the connection-oriented network 302 requesting the establishment of call over an optimal path to the destination Client Call Controller 306B.

Figure 4:
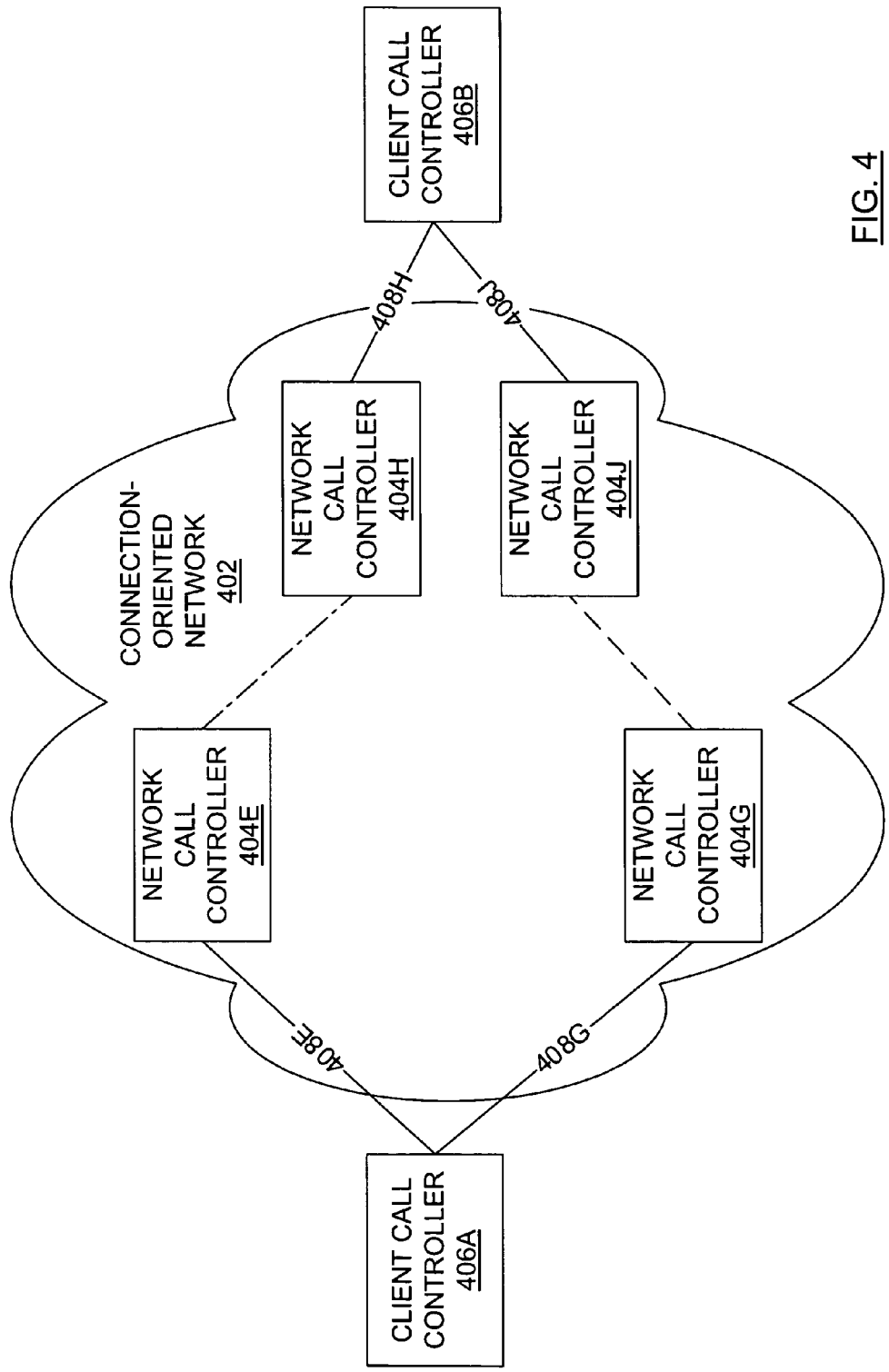
FIG. 4 illustrates a connection-oriented network connecting a source to a destination and may be used for a discussion of a "Diverse Path" implementation of dual homing.

FIG. 4 illustrates another example of dual homing. In the "Diverse Path" example of FIG. 4, a source Client Call Controller 406A may communicate with a connection-oriented network 402 over one of two UNIs 408E, 408G to a corresponding Network Call Controller 404E, 404G. On the destination end, a destination Client Call Controller 406B may communicate with the connection-oriented network 402 over one of two UNIs 408H, 408J to a corresponding Network Call Controller 404H, 404J. The source Client Call Controller 406A sends a call request message to the connection-oriented network 402 requesting the establishment of a first call between the source Client Call Controller 406A and the destination Client Call Controller 406B. The call request message indicates that a further call request message will follow, requesting the establishment of a second call between the source Client Call Controller 406A and the destination Client Call Controller 406B, where the path for the second call is diverse from the path for the first call.

Another scenario exists in which a first call has been established between the source Client Call Controller 406A and the destination Client Call Controller 406B, say, over the source UNI 408E, and the source Client Call Controller 406A requires a second path setup to the destination Client Call Controller 406B that is diverse from the first connection. The source Client Call Controller 406A sends a query message to the connection-oriented network 402 requesting information about the first call. A query response message from the connection-oriented network 402 contains encrypted information about the first call. The source Client Call Controller 406A may then send a call request message over the alternative source UNI 408G with the received, encrypted information about the first call so that the network can attempt to compute a path for a second call that is diverse from the path for the first call.

Figure 5:
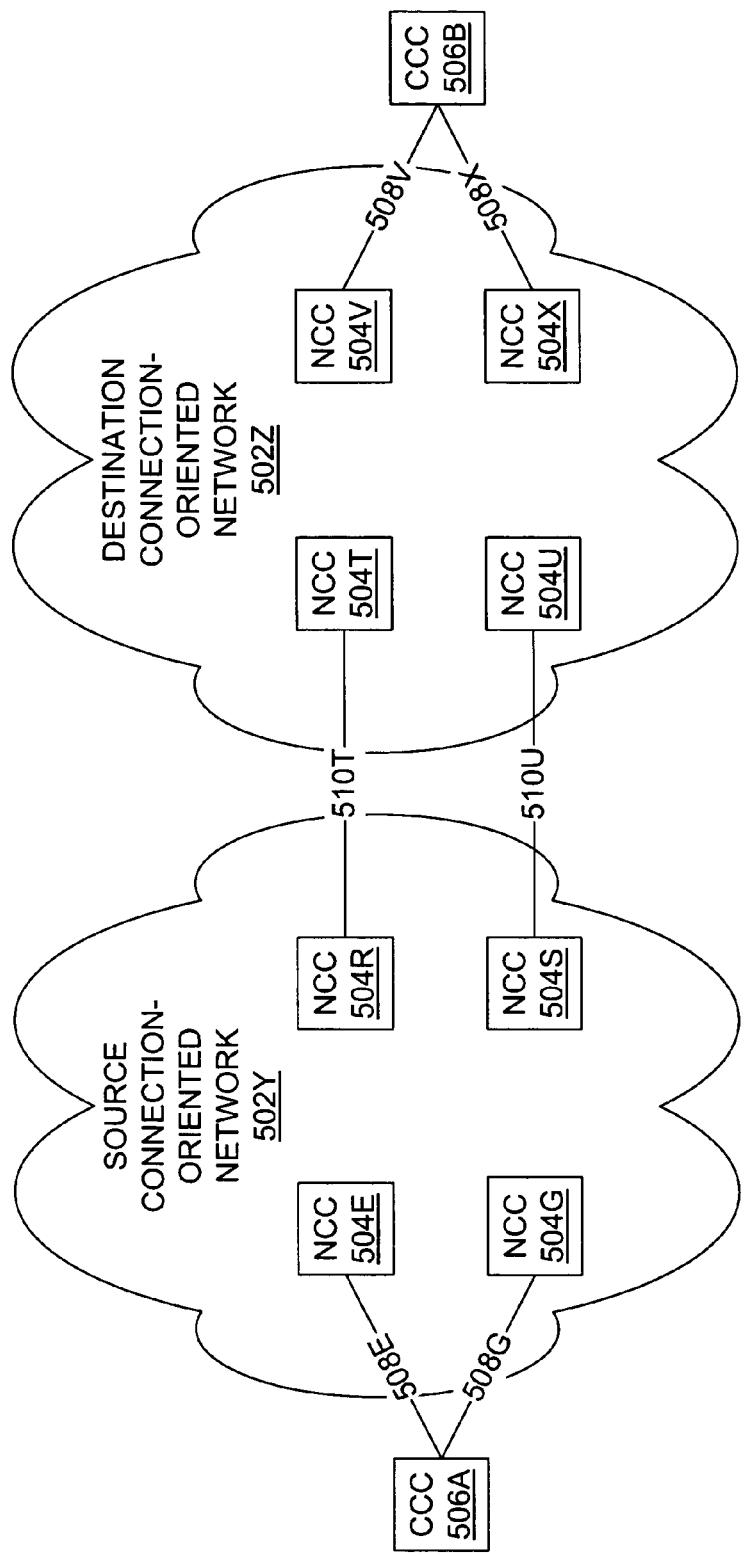
FIG. 5 illustrates two connection-oriented networks connecting a source to a destination and may be used for a discussion of a "E-NNI Diverse Path" implementation of dual homing.

FIG. 5 illustrates a further example of dual homing. In the "E-NNI Diverse Path" example of FIG. 5, a source Client Call Controller (CCC) 506A may communicate with a source connection-oriented network 502Y over one of two UNIs 508E, 508G to a corresponding Network Call Controller 504E, 504G. On the destination end, a destination Client Call Controller (CCC) 506B may communicate with a destination connection-oriented network 502Z over one of two UNIs 508V, 508X to a corresponding Network Call Controller 504V, 504X. The source Client Call Controller 506A sends a call request message to the source connection-oriented network 502Y, requesting the establishment of a first call between the source Client Call Controller 506A and the destination Client Call Controller 506B. The call request message indicates that a further call request message will follow, requesting the establishment of a second call between the source Client Call Controller 506A and the destination Client Call Controller 506B, where the path for the second call is diverse from the path for the first call.

To reach the destination connection-oriented network 502Z, the source Network Call Controllers 504E, 504G of the source connection-oriented network 502Y make use of egress gateway Network Call Controllers 504R, 504S that are also in the source connection-oriented network 502Y. The internal connectivity within the source connection-oriented network 502Y is not shown. The egress gateway Network Call Controllers 504R, 504S connect to ingress gateway Network Call Controllers 504T, 504U in the destination connection-oriented network 502Z over corresponding E-NNIs 510T, 510U (referenced herein individually or collectively as 510). To provide an E-NNI Diverse Path, the source Network Call Controllers 504E, 504G determine paths to the destination Client Call Controller 506B that each utilize a distinct E-NNI 510. Notably, the source Client Call Controller 506A need not be aware of the use of diverse E-NNIs 510.

Figure 6:
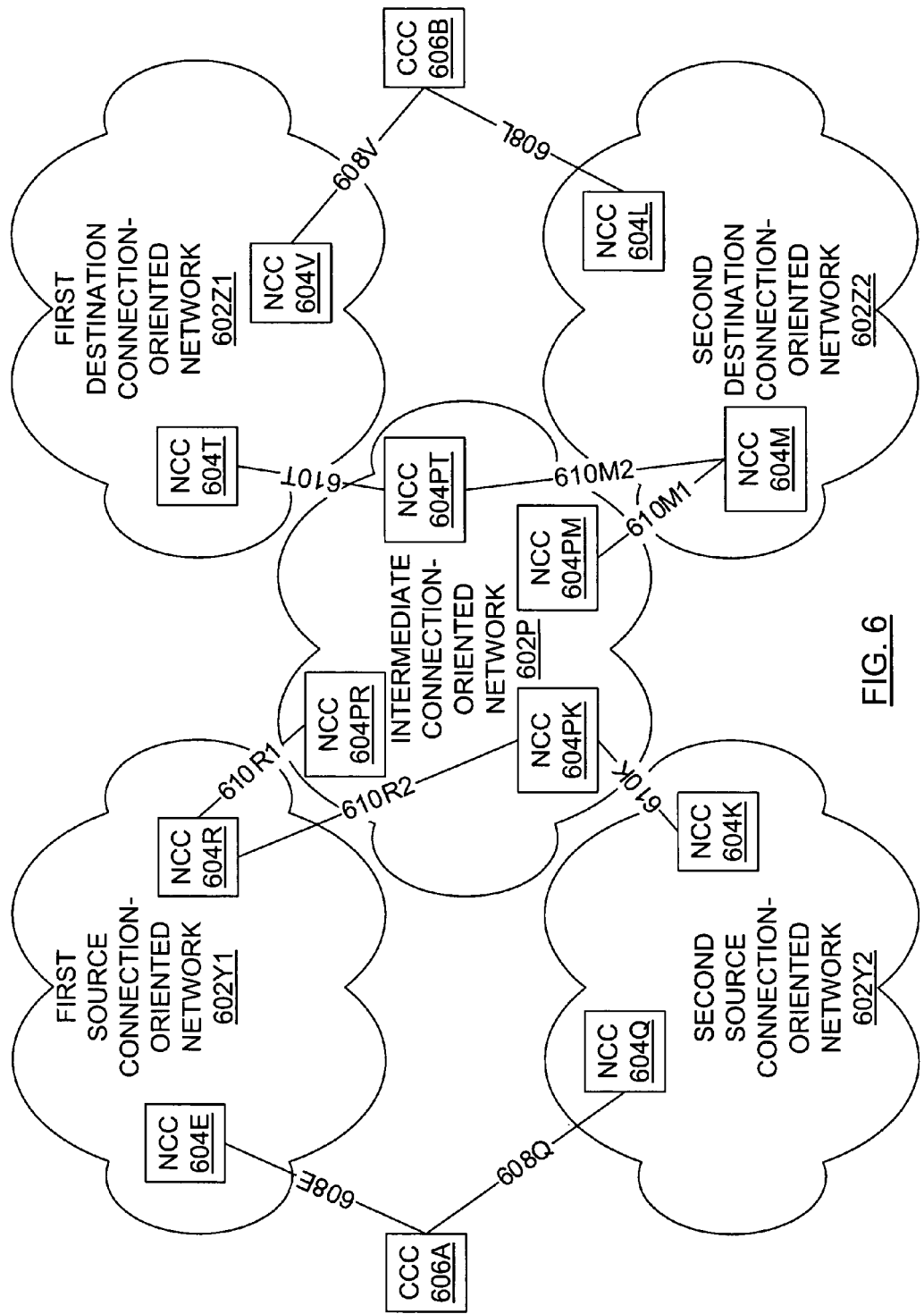
FIG. 6 illustrates five connection-oriented networks connecting a source to a destination and may be used for a discussion of a "Multi-Network Diverse Path" implementation of dual homing.

FIG. 6 illustrates a further example of dual homing. In the "Multi-Network Diverse Path" example of FIG. 6, a source Client Call Controller (CCC) 606A may communicate with a first source connection-oriented network 602Y1 over a first UNI 608E to a first source Network Call Controller 604E and with a second source connection-oriented network 602Y2 over a second UNI 608Q to a second Network Call Controller 604Q. On the destination end, a destination Client Call Controller (CCC) 606B may communicate with a first destination connection-oriented network 602Z1 over a first UNI 608V to a first destination Network Call Controller 604V and with a second destination connection-oriented network 602Z2 over a second UNI 608L to a second destination Network Call Controller 604L. The first source connection-oriented network 602Y1 and the second source connection-oriented network 602Y2 inter-connect to an intermediate connection-oriented network 602P.

The source Client Call Controller 606A sends a call request message to the source connection-oriented networks 602Y1, 602Y2 requesting the establishment of a first call between the source Client Call Controller 606A and the destination Client Call Controller 606B. The call request message indicates that a further call request message will follow, requesting the establishment of a second call between the source Client Call Controller 606A and the destination Client Call Controller 606B, where the path for the second call is to be diverse from the path for the first call.

To reach the intermediate connection-oriented network 602P on the way to a first destination connection-oriented network 602Z1, the first source Network Call Controller 604E makes use of an egress gateway Network Call Controller 604R in the first source connection-oriented network 602Y1. The internal connectivity within the first source connection-oriented network 602Y1 is not shown. The egress gateway Network Call Controller 604R connects to an ingress gateway Network Call Controller 604PR in the intermediate connection-oriented network 602P over an E-NNI 610R1. To reach the first destination connection-oriented network 602Z1, the ingress gateway Network Call Controller 604PR in the intermediate connection-oriented network 602P makes use of an egress gateway Network Call Controller 604PT to the first destination connection-oriented network 602Z1, which connects to an ingress gateway Network Call Controller 604T in the first destination connection-oriented network 602Z1 over an E-NNI 610T. Within the first destination connection-oriented network 602Z1, the ingress gateway Network Call Controller 604T connects to the first destination Network Call Controller 604V from which the first UNI 608V connects to the destination Client Call Controller (CCC) 606B.

Similarly, to reach the intermediate connection-oriented network 602P on the way to a second destination connection-oriented network 602Z2, the second source Network Call Controller 604Q makes use of an egress gateway Network Call Controller 604K in the second source connection-oriented network 602Y2. The internal connectivity within the second source connection-oriented network 602Y2 is not shown. The egress gateway Network Call Controller 604K connects to an ingress gateway Network Call Controller 604PK in the intermediate connection-oriented network 602P over an E-NNI 610K. To reach the second destination connection-oriented network 602Z2, the ingress gateway Network Call Controller 604PK in the intermediate connection-oriented network 602P makes use of an egress gateway Network Call Controller 604PM to the second destination connection-oriented network 602Z2, which connects to an ingress gateway Network Call Controller 604M in the second destination connection-oriented network 602Z2 over an E-NNI 610M1. Within the second destination connection-oriented network 602Z2, the ingress gateway Network Call Controller 604M connects to the second destination Network Call Controller 604L from which the second UNI 608L connects to the destination Client Call Controller (CCC) 606B.

To provide a Multi-Network Diverse Path, the ingress gateway Network Call Controller 604PR and the ingress gateway Network Call Controller 604PK are required to communicate through the intermediate connection-oriented network 602P to respective egress gateway Network Call Controllers 604PT, 604PM over diverse paths. Notably, the source Client Call Controller 606A need not be aware of the use of the intermediate connection-oriented network 602P.

In the examples described in conjunction with FIGS. 4, 5 and 6, computing a path that meets specific constraints requires a path computation method that considers the existence, or future existence, of other paths. "Path information", or context, is required by the Network Call Controllers involved in initiating such a path computation, where this path information relates to paths in use by existing calls.

Figure 7:
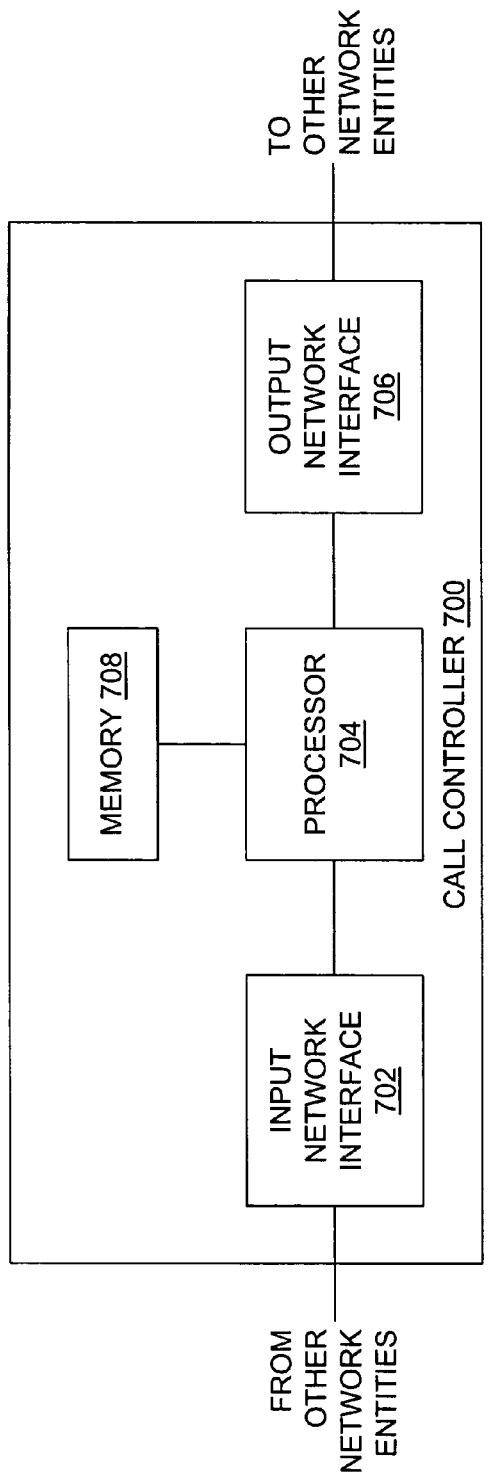
FIG. 7 illustrates a generic call controller for use in the connection-oriented networks of FIGS. 1-6 according to an embodiment of the present invention.

FIG. 7 illustrates a generic call controller 700 for use, as either a Client call Controller or a Network Call Controller, in the connection-oriented networks of FIGS. 1-6. The call controller 700 includes a processor 704 in communication with a memory 708, an input network interface 702 and an output network interface 706. The input network interface 702 receives call processing messages and other network traffic while the output network interface 706 transmits call processing messages and other network traffic. As will be apparent to a person skilled in the art, the input network interface 702 and the output network interface 706 may co-exist in a bi-directional network interface.

In overview, aspects of the present invention allow two Network Call Controllers to communicate with each other by amending call processing messages. Such call processing messages include, for example, call accept messages and call request messages. For instance, information about a path used by a first call may be communicated in a call accept message generated at a Network Call Controller. This information may then be included in a subsequent call request message generated at a Client Call Controller so that one Network Call Controller can avoid path segments used in a path established by another Network Call Controller. That is, the communication may provide the Network Call Controllers with the path information necessary to compute a path that meets constraints specified in a call request message.

As a result of the communication of path and other locally known information between two or more Network Call Controllers, those Network Call Controllers possess additional network context. This enables the Network Call Controllers to make path computations that include dependencies on the local information known by other Network Call Controllers. For example, calls may be setup that are dependent on other calls.

Preferably, an encryption/decryption scheme is employed by all Network Call Controllers in a given network. So that, for example, a Network Call Controller connected to one UNI can encrypt information that may be decrypted by another Network Call Controller connected to a different UNI.

Returning to FIG. 3, the source Client Call Controller 306A initiates a call by sending a call request message to the source Network Call Controller 304F in the connection oriented network 302. The call request message may include identifiers of the local UNIs 308E, 308F, 308G connected to the source Client Call Controller 306A and the remote UNIs 308H, 308J connected to the destination Client Call Controller 306B. For descriptive purposes, the client side of a UNI 308 may be called a "UNI-C" and the network side of a UNI 308 may be called a "UNI-N".

The UNI-N of the source Network Call Controller 304F may be generically called the "call control entity" that receives the call request message from the UNI-C of the source Client Call Controller 306A. The UNI-N of the source Network Call Controller 304F processes the call inside the connection oriented network 302. As the call is in a single network, the source Network Call Controller 304F selects a UNI-N 308J connected to the destination Client Call Controller 306B. The source Network Call Controller 304F then computes a path, perhaps with intermediate path segment end points (i.e., network entities along the computed path from the source Network Call Controller 304F to the destination Network Call Controller 304J), to the destination Network Call Controller 304J associated with the selected UNI-N 308J. The source Network Call Controller 304F then establishes a call over the computed path to the destination Network Call Controller 304J. A connection may be established at the same time.

A single Network Call Controller could simultaneously compute the multiple paths that are in the same network, where the multiple paths start and end at different Network Call Controllers. Additionally, after having computed one path to a destination Network Call Controller, the source Network Call Controller could also consider alternative paths to the destination Network Call Controller as well as alternative paths to other Network Call Controllers, where all of the alternative paths are constrained to not use path segments, where the path segments are defined by path segment end points, used in previous paths.

Certain information about the established connection and the call used by the established connection may be retained at the UNI-N of the source Network Call Controller. This information may be passed from the UNI-N of the source Network Call Controller back to the UNI-C of the source Client Call Controller along with a call accept message or a call reject message. The information that is not public may be encrypted by the UNI-N of the source Network Call Controller before being passed. Additionally, the information may include information from all of the intermediate path segment end points in the computed path used by the call and connection.

Information within the scope of each network participating in the call and connection may be separately encrypted. Preferably, the encryption key is network specific. That is, the encryption may be only decrypted by other call control entities in the network in which the information originated. In a preferred scenario, each network has its own encryption key, so that the information encrypted by call control entities in one network will not be decrypted by call control entities in other networks.

The source Client Call Controller 306A stores the encrypted call and connection information. The encrypted call and connection information may then be provided along with a subsequent call request message to the connection oriented network 302. When a Network Call Controller in the connection oriented network 302 receives this call request message, the Network Call Controller may decrypt information about other calls and connections and use the decrypted information to establish the requested call. This encrypted information may be included in the signaling messages that normally travel over a UNI.

As discussed hereinbefore, a call may be required to be established across multiple networks, as shown in FIGS. 5 and 6. Specifically, in the network shown in FIG. 5, the UNI-C of the source Client Call Controller 506A may send a call request message to the UNI-N of the source Network Call Controller 504E, where the call request message specifies the UNI-N of the destination Network Call Controller 504V that connects to the destination Client Call Controller 506B. The UNI-N of the source Network Call Controller 504E processes the call inside the source connection oriented network 502Y. In particular, the source Network Call Controller 504E determines, through a review of maintained network topology, that Network Call Controllers in the destination connection oriented network 502Z can reach the destination UNI 508V or 508X. As a result of this determination, the source Network Call Controller 504E selects the egress gateway Network Call Controller 504R to connect to the destination connection oriented network 502Z. The source Network Call Controller 504E then computes a path to the egress gateway Network Call Controller 504R and uses the computed path to establish a call and associated connection to the egress gateway Network Call Controller 504R.

The egress gateway Network Call Controller 504R then selects the ingress gateway Network Call Controller 504T in the neighbor network. Note that, even though E-NNIs to other ingress gateway Network Call Controllers in the destination connection-oriented network 502Z are not shown, there may be multiple such ingress gateway Network Call Controllers and the egress gateway Network Call Controller 504R may be faced with a choice.

The ingress gateway Network Call Controller 504T then computes a path, perhaps with intermediate path segment end points, to the destination Network Call Controller 504V associated with the selected UNI 508V. The ingress gateway Network Call Controller 504T then establishes a call over the computed path and further establishes a connection that uses the established call.

Again, certain information about the established connection and the call used by the established connection may be retained at the UNI-N of the source Network Call Controller 504E. This information may be passed from the UNI-N of the source Network Call Controller 504E back to the UNI-C of the source Client Call Controller 506A along with a call accept message that confirms that the call is established. The information that is not public may be encrypted by the UNI-N of the source Network Call Controller 504E before being passed. Included in the information passed by the UNI-N of the source Network Call Controller 504E may be information related to the call, and the connection using the call, that is specific to the destination connection-oriented network 502Z. The information that is specific to the destination connection-oriented network 502Z may pass, encrypted, from the ingress gateway Network Call Controller 504T to the egress gateway Network Call Controller 504R over the E-NNI 510T used by the call.

The source Client Call Controller 506A stores the encrypted call and connection information. The encrypted call and connection information may then be provided along with a subsequent call request message to the source connection oriented network 502Y. When a Network Call Controller in the source connection oriented network 502Y receives this call request message, the Network Call Controller may decrypt information about other calls and connections and use the decrypted information to establish the requested call. This encrypted information may be included in the signaling messages that normally travel over an E-NNI, as well as those previously mentioned signaling messages that normally travel over a UNI.

The specific implementation of the above broadly described method of communicating call and connection information between Network Call Controller varies according to the application.

In the Optimal Path application, the proposed method uses a "call reject" message to carry a path result including an identification of a source UNI, a destination UNI and, maybe, encrypted information about a connection. With reference to FIG. 3, a possible sequence of events begins when the source Client Call Controller 306A sends a call request message to a source Network Call Controller 304 using one of the available local UNIs 308, say local UNI 308F. The source Client Call Controller 306A may pass identifiers for alternative local UNIs 308E, 308G, connected to the source Client Call Controller 306A, and identifiers for alternative remote UNIs 308H, 308J, connected to the destination, in the call request message.

The source Network Call Controller 304F computes and examines possible paths and selects the optimal one. If this optimal path should start from the source UNI 308F, the source Network Call Controller 304F establishes a call over the optimal path. Otherwise, the source Network Call Controller 304F rejects the call by sending a call reject message to the source Client Call Controller 306A. The source Network Call Controller 304F includes a special error code in the call reject message. Additional information in the call reject message may include, in encrypted form, an identifier of a local UNI 308 and a remote UNI 308 to act as the source UNI and the destination UNI for the optimal path and, possibly, information about intermediate path segment end points along the optimal path.

The source Client Call Controller 306A then selects the source UNI, say UNI 308G, of the optimal path identified in the call reject message and sends a new call request message over the selected UNI 308G. The new call request message includes the optimal path information received in the call reject message. When the source Network Call Controller 304G on network side of the selected UNI 308G receives the call request message, the source Network Call Controller 304G learns the destination UNI of the optimal path from the call request message. The source Network Call Controller 304G may also decrypt the optimal path information and, thereby, learn how to establish a call to obtain an optimal path.

In the Diverse Path application, the goal is to establish two calls, where the two calls have diverse paths between the source Client Call Controller and the destination Client Call Controller, where each Client Call Controller has two reference points of attachment to a shared network. That is, each Client Call Controller has, at least, two UNIs to the same network. In one embodiment of the present invention, a call accept message is used to carry a path result including an identification of a source UNI, a destination UNI and encrypted information about an established call. While, in another embodiment, the source Client Call Controller may query the shared network for information about a previously established call.

With reference to FIG. 4, a possible sequence of events begins when the source Client Call Controller 406A initiates a call to the destination Client Call Controller 406B by sending a call request message, which identifies the source UNI 408E and the destination UNI 408H, over the source UNI 408E. The call request message requests a first call to the destination Client Call Controller 406B and indicates that a second call request will follow, for a second call to the destination Client Call Controller 406B. To provide the source Network Call Controller 404E with information related to the second call, the call request message also contains the identity of the alternate source UNI 408G as well as the identity of the alternate destination UNI 408J. A constraint is indicated for the second call, requiring that the second call has a path diverse from the path for the first call.

The source Network Call Controller 404E computes a path between the source UNI 408E and the destination UNI 408H and may also compute a path, for the second call, between the alternate source UNI 408G and the alternate destination UNI 408J, where the path for the second call is diverse from the path for the first call.

The source Network Call Controller 404E then establishes the first requested call over the path computed for the first call to destination Network Call Controller 404H, and may establish a connection for that call. The call request message is then sent over the destination UNI 408H to the destination Client Call Controller 406B. The destination Client Call Controller 406B accepts the call by sending a call accept message to the destination Network Call Controller 404H over the destination UNI 408H. The call accept message includes an identity of the destination UNI 408J that is not used by the first one of the requested calls. Note that this destination UNI identity need not be encrypted. The destination Network Call Controller 404H passes the call accept message to the source Network Call Controller 404E and the source Network Call Controller 404E passes the call accept message to the source Client Call Controller 406A. By the time the call accept message is sent to the source Client Call Controller 406A, the call accept message may also include detailed information about the path computed for the first requested call and, perhaps, the path computed for the second requested call. This path information should be encrypted.

The source Client Call Controller 406A receives the call accept message over the source UNI 408E and initiates the second call by sending a call request message over the alternative source UNI 408G. The call request message, including the path information, received in the call accept message, such as the identity of the destination UNI 408J for the second call, is received by the alternative source Network Call Controller 404G.

The alternative source Network Call Controller 404G computes a path for the second call, taking into account received encrypted information about the path of the first call that was included in the call request message. Alternatively, where the source Network Call Controller 404E has already computed a path for the second call that is diverse from the path for the first call, the alternative source Network Call Controller 404G may simply decrypt, from the information included in the call request message, a description of the computed path for the second call.

Independent of whether the path for the second call is computed or merely decrypted, the alternative source Network Call Controller 404G may then establish the second call, over the path for the second call, to the destination Network Call Controller 404J associated with the destination UNI 408J. A connection may be established along with the second call. The destination Network Call Controller 404J then employs the destination UNI 408J to send the call request message to the destination Client Call Controller 406B.

In the above example, a first call request message requests a first call to the destination Client Call Controller 406B and indicates that a second call request will follow, for a second call to the destination Client Call Controller 406B. It may be the case, however, that a first call has been established without specifying that a second call would follow. It may subsequently be decided that a second call is required and that the second call should have a path diverse from the path for the first call.

Consider that a first call exists between the source Client Call Controller 406A and the destination Client Call Controller 406B and that the first call uses the source UNI 408E, the source Network Call Controller 404E, the destination Network Call Controller 404H and the destination UNI 408H. Further, consider that the source Client Call Controller 406A has established the first call as a single call without knowledge of any future desired calls. Subsequently, the source Client Call Controller 406A requires a second call to the destination Client Call Controller 406B with a constraint that the path for the second call should be diverse from the path for the first call.

Before sending a call request message, the source Client Call Controller 406A sends a query message to the source Network Call Controller 404E to request information about the first connection. The source Network Call Controller 404E responds with a query response message that includes encrypted details about the first call.

The source Client Call Controller 406A may then include the encrypted details about the first call in a call request message for the second call. The call request message for the second call is then sent, by the source Client Call Controller 406A, to the alternative source Network Call Controller 404G over the alternative source UNI 408G. Alternatively, the call request message for the second call may be sent to the source Network Call Controller 404E.

The alternative source Network Call Controller 404G receives the call request message for the second call and attempts to compute a path to the destination Client Call Controller 406B, where the computed path for the second call is diverse from the path already in use for the first call. If successful, the alternative source Network Call Controller 404G may establish the second call, over the computed path for the second call, to the destination Network Call Controller 404J associated with the destination UNI 408J. A connection may be established along with the second call. The destination Network Call Controller 404J then employs the destination UNI 408J to send the call request message to the destination Client Call Controller 406B.

In the E-NNI Diverse Path application, the proposed method uses call accept messages to pass information about the gateway Network Call Controllers used in establishing paths. Since the identifiers for gateway Network Call Controllers are public addresses, the information about the gateway Network Call Controllers need not be encrypted. With reference to FIG. 5, a possible sequence of events begins when the source Client Call Controller 506A sends a call request message to a source Network Call Controller 504 using one of the available UNIs 508, say UNI 508E. The call request message requests a first call, to the destination Client Call Controller 506B, but indicates that a request for a second call, to the destination Client Call Controller 506B, will be requested. The second call is requested to have a path diverse from the path of the first call. The first call request message may include the identity of the possible destination UNIs 508V, 508X as well as the identity of the other source UNI 508G for the second call.

As will be apparent to a person skilled in the art, the source Client Call Controller 506A may not be aware of the identities of the possible destination UNIs 508V, 508X, but should have a capability to learn these identities through a query to a network entity (not shown) that maintains a mapping of Client Call Controllers 506 to identities of UNIs 508. The Domain Name Service of the present-day Internet serves such a purpose.

The source Network Call Controller 504E determines that the possible destination UNIs 508V, 508X are in the destination connection-oriented network 502Z and selects one of the egress gateway Network Call Controllers 504R, 504S that connect the source connection oriented network 502Y to the destination connection-oriented network 502Z.

Where it is considered that the source Network Call Controller 504E has selected the egress gateway Network Call Controller 504R to reach the destination connection-oriented network 502Z, the source Network Call Controller 504E calculates a path to the egress gateway Network Call Controller 504R and establishes a call over the calculated path. A connection may be established along with the first call. The source Network Call Controller 504E may also select the other egress gateway Network Call Controller 504S for use by the second requested call. Where the source Network Call Controller 504E has selected the other egress gateway Network Call Controller 504S for use by the second requested call, the source Network Call Controller 504E may also calculate a path for the second requested call.

A call request message, for the first call, may then be sent to the egress gateway Network Call Controller 504R. Where the egress gateway Network Call Controller 504R selects the ingress gateway Network Call Controller 504T, the call request message is forwarded over the E-NNI 510T to the selected ingress gateway Network Call Controller 504T. Included in the call request message sent to the selected ingress gateway Network Call Controller 504T is an non-encrypted indication of the other egress gateway Network Call Controller 504S for use by the second requested call. Furthermore, in an encrypted form, the call request message may include information about the intermediate path segment end points in the source connection oriented network 502Y used in the path for the first call. Additionally, the call request message may include encrypted information about the intermediate path segment end points in the source connection oriented network 502Y in the calculated path for the second call.

The selected ingress gateway Network Call Controller 504T, upon receiving the call request message, may note that, in future, a second call request message will be arriving, at the destination connection-oriented network 502Z, from the other egress gateway Network Call Controller 504S. Responsive to noting the second call request message, the selected ingress gateway Network Call Controller 504T may select an other ingress gateway Network Call Controller 504U for the second call. The selection of the other ingress gateway Network Call Controller 504U for the second call may then be recorded in the call request message. The selected ingress gateway Network Call Controller 504T then selects one of the destination Network Call Controllers 504V, 504X, say the destination Network Call Controller 504V, and calculates a path to the selected destination Network Call Controller 504V. The selected ingress gateway Network Call Controller 504T may also calculate a path for the second call from the other ingress gateway Network Call Controller 504U to the other destination Network Call Controller 504X.

A connection may be established along with the call. The call request message may then be passed from the selected destination Network Call Controller 504V to the destination Client Call Controller 506B over the UNI 508V that connects the Call Controllers.

Where the destination Client Call Controller 506B accepts the call, the call accept message directed to the source Client Call Controller 506A may include information identifying the other egress gateway Network Call Controller 504S for the second call, which does not need to be encrypted. The call accept message may also include the encrypted information about the path from the source Network Call Controller 504E to the egress gateway Network Call Controller 504R and the encrypted information about the path from the other source Network Call Controller 504G to the other egress gateway Network Call Controller 504S, if such a path was calculated. Additionally, the call accept message may include the identity of the other ingress gateway Network Call Controller 504U for the second call, which does not need to be encrypted. The call accept message may include an indication of the identity of the other destination Network Call Controller 504X, for the second call. Furthermore, the call accept message may include encrypted information identifying intermediate path segment end points in the path, for the first call, from the ingress gateway Network Call Controller 504U to the destination Network Call Controller 504X and intermediate path segment end points in the path, for the second call, from the other ingress gateway Network Call Controller 504U to the other destination Network Call Controller 504X, if the latter path was calculated.

The source Client Call Controller 506A receives the call accept message over the initially selected UNI 508E and initiates the second call by sending a call request message over the other source UNI 508G. When the other source Network Call Controller 504G receives the call request message, the information included in the call request message may indicate to the other source Network Call Controller 504G that the other egress gateway Network Call Controller 504S should be used to reach the destination connection-oriented network 502Z. The information included in the call request message may also indicate, preferably in encrypted form, a diverse path for a call between the other source Network Call Controller 504G and the other egress gateway Network Call Controller 504S. The other source Network Call Controller 504G may then establish the second call over a path to the other egress gateway Network Call Controller 504S, whether that path was supplied in the call request message or calculated independently, with awareness of the decrypted information relating to the path for the first call.

When the call request message is received by the other egress gateway Network Call Controller 504S, indications included within the call request message allow the call request message to be forwarded over the E-NNI 510U to the other ingress gateway Network Call Controller 504U.

When the other ingress gateway Network Call Controller 504U receives the call request message, information included within the call request message may allow the other ingress gateway Network Call Controller 504U to use the other destination Network Call Controller 504X as a destination for a path for the second call. The call request message may also include encrypted information providing a path from the other ingress gateway Network Call Controller 504U to the other destination Network Call Controller 504X. The other ingress gateway Network Call Controller 504U may then establish a call to the other destination Network Call Controller 504X and establish a connection over the established call.

At the other destination Network Call Controller 504X, the call request message is forwarded to the destination Client Call Controller 506B over the UNI 508X that connects the two Call Controllers.

Assuming the destination Client Call Controller 506B accepts the call request message, the two end-to-end diverse paths are composed by three diverse elements: 1) a path in the source connection-oriented network 502Y; 2) an E-NNI 510 connecting the source connection-oriented network 502Y to the destination connection-oriented network 502Z; and 3) a path in the destination connection-oriented network 502Z.

In the Multi-Network Diverse Path application, the proposed method includes identifiers of networks, instead of identifiers of UNIs, in the call processing signaling messages. With reference to FIG. 6, a possible sequence of events begins when the source Client Call Controller 606A sends a call request message to a source Network Call Controller 604 using one of the available UNIs 608, say UNI 608E.

The call request message requests a first call, to the destination Client Call Controller 606B, but indicates that a request for a second call, to the same destination Client Call Controller 606B, will be requested. The second call is requested to have a path diverse from the path of the first call. The first call request message includes the identity of the possible destination UNIs 608V, 608L as well as the identity of the second source connection-oriented network 602Y2 to be used by the second call.

The first source Network Call Controller 604E in the first source connection-oriented network 602Y1, given that the second call is to be established in a different network, selects the egress gateway Network Call Controller 604R and calculates a path for the first call without consideration of a need for a diverse path for a second call. A connection between first source Network Call Controller 604E and the egress gateway Network Call Controller 604R may be established along with the call.

When the egress gateway Network Call Controller 604R receives the call request message, the egress gateway Network Call Controller 604R selects an ingress gateway Network Call Controller in the intermediate connection-oriented network 602P. In particular, the ingress gateway Network Call Controller 604PR is selected while taking into consideration that an ingress gateway Network Call Controller in the intermediate connection-oriented network 602P may be selected, for the second call, by an egress gateway Network Call Controller in the second source connection-oriented network 602Y2.

When the ingress gateway Network Call Controller 604PR receives a call request, the ingress gateway Network Call Controller 604PR may, in consideration of the second call, select the ingress gateway Network Call Controller 604PK for the second call. The identity of the ingress gateway Network Call Controller 604PK for the second call may then be included in the call request message as the message is further propagated.

Where the ingress gateway Network Call Controller 604PR has an awareness that the egress gateway Network Call Controller 604PT can be used to connect to the first destination connection-oriented network 602Z1 over the E-NNI 610T and can be used to connect to the second destination connection-oriented network 602Z2 over the E-NNI 610M2, the ingress gateway Network Call Controller 604PR may also have awareness that the egress gateway Network Call Controller 604PM can be used to connect to the second destination connection-oriented network 602Z2 over the E-NNI 610M1. Given this awareness, the ingress gateway Network Call Controller 604PR may select the egress gateway Network Call Controller 604PT for the first call and the egress gateway Network Call Controller 604PM for the second call. The identity of the E-NNI 610M1 for use by the second call may be recorded in the call request message.

The ingress gateway Network Call Controller 604PR may then proceed to calculate a path to the selected egress gateway Network Call Controller 604PT for the first call, establish a call over that path and establish a connection for that call. The ingress gateway Network Call Controller 604PR may also calculate a path from the ingress gateway Network Call Controller 604PK to the egress gateway Network Call Controller 604PM for the second call, where the path for the second call is diverse from the path for the first call.

When the call request message is received by the selected egress gateway Network Call Controller 604PT, the call request message may include the identity of the ingress gateway Network Call Controller 604PK for the second call (without encryption), the identity of the egress gateway Network Call Controller 604PM for the second call (without encryption) and information relating to the intermediate path segment end points, within the intermediate connection-oriented network 602P, used in the path for the first call. The received call request message may also include information relating to the intermediate path segment end points for use in the path calculated for the second call.

The egress gateway Network Call Controller 604PT then selects the ingress gateway Network Call Controller 604T in the first destination connection-oriented network 602Z1 and passes the call request message over the E-NNI 610T to the ingress gateway Network Call Controller 604T. Given that the second call will be making use of the second destination connection-oriented network 602Z2 (an indication of which being included in the call request message), the ingress gateway Network Call Controller 604T may calculate a path to the first destination Network Call Controller 604V without consideration of the second call. The ingress gateway Network Call Controller 604T may then establish a call over the calculated path and establish a connection for that call. The first destination Network Call Controller 604V may then pass the call request message to the destination Client Call Controller 606B over the corresponding UNI 608V.

The destination Client Call Controller 606B, upon receiving the call request message may generate a call accept message and send the call accept message back to the source Client Call Controller 606A.

The source Client Call Controller 606A, upon receiving the call accept message, may initiate the second call by sending a call request message to the second source Network Call Controller 604Q over the UNI 608Q.

As described hereinbefore, when the call request message is received by the second source Network Call Controller 604Q, the call request message may include the identity of the ingress gateway Network Call Controller 604PK for the second call (without encryption), the identity of the egress gateway Network Call Controller 604PM for the second call (without encryption). The received call request message may also include information relating to the intermediate path segment end points for use in the path calculated for the second call.

The second source Network Call Controller 604Q, aware that the egress gateway Network Call Controller 604K connects to the ingress gateway Network Call Controller 604PK, may calculate a path to the egress gateway Network Call Controller 604K, establish a call over the calculated path and establish a connection for that call.

Upon receiving the call request message, the egress gateway Network Call Controller 604K may learn from the call request message that the ingress gateway Network Call Controller 604PK is to be the next recipient of the call request message.

The ingress gateway Network Call Controller 604PK, upon reviewing the received call request message, may be made aware of the identity of the egress gateway Network Call Controller 604PM for the second call and, perhaps, even the intermediate path segment end points for use in the path already calculated for the second call. The information relating to these intermediate path segment end points is preferably encrypted in such a way that the information may only be decrypted by a Network Call Controller in the intermediate connection-oriented network 602P. The ingress gateway Network Call Controller 604PK may then establish a call over the already calculated path or over a path calculated with awareness of the intermediate path segment end point used by the path for the first call. A connection may be established along with the call.

When the call request message is received by the egress gateway Network Call Controller 604PM, the egress gateway Network Call Controller 604PM may learn from the call request message that the ingress gateway Network Call Controller 604M is to be the next recipient of the call request message.

The ingress gateway Network Call Controller 604M, upon receipt of the call request message, calculates a path to the second destination Network Call Controller 604L and establishes a call and connection based on the calculated path.

The call request message, once received by the second destination Network Call Controller 604L, may then be passed on to the destination Client Call Controller 606B. The destination Client Call Controller 606B, upon receiving the call request message for the second call, may generate a call accept message and send the call accept message back to the source Client Call Controller 606A.

To incorporate aspects of the present invention into existing network practices, some changes may be required. For instance, an indication that a second call (on a diverse path) is to be established may be considered when performing path computation for a first path. As well, existing network practices do not typically include a provision for a query message from a Client Call Controller to a Network Call Controller and a query response message back to the Client Call Controller from the Network Call Controller. Recall that the response message contains encrypted network information. Additionally, the protocol used on an E-NNI should support the exchange of such information as an identifier of a gateway Network Call Controller and identifier of a network.

Aspects of the present invention require the encryption of call and connection information in a call request message when the call request message is sent over a UNI by a source Client Call Controller, when the call request message is sent over a UNI to a destination Client Call Controller and when the call request message is sent from an egress gateway Network Call Controller to an ingress gateway Network Call Controller over an E-NNI. Encrypted call and connection information may also be included in a call accept message passed from a destination Client Call Controller to a source Client Call Controller and in a call reject message passed from a source Network Call Controller to source Client Call Controller. Aspects of the present invention may also require the indication, in a call request message, of UNIs, E-NNIs and networks to be used by a second call. Since the identifier of a UNI or a E-NNI is a public address, and the public knows the identifier of network, this information does not need to be encrypted. Aspects of the present invention may further require the use of a new error code in call reject messages. The new error code would be used to indicate information about the call and connection being rejected.

Call processing in networks adapted to employ aspects of the present invention may be required to have an ability to support connection separation when a call is across multiple networks. A gateway Network Call Controller is required for both the network egress and network ingress side of an E-NNI. Additionally, call processing in networks adapted to employ aspects of the present invention may be required to have an ability to amend signaling messages to include encrypted information and, conversely, have an ability to strip decrypted information from signaling messages.

According to aspects of the present invention, each network is required to manage an encryption key and the encryption key for a given network is required to be distributed to all of the Network Call Controllers in the given network.

In a given network operating according to aspects of the present invention, a Network Call Controller may receive a call request message including information, such as that relating to a path for a first call, that is encrypted with an encryption key particular to the given network. However, if the Network Call Controller is, for some reason, unaware of the encryption key then the Network Call Controller may proceed to calculate a path for the requested call without the benefit of the encrypted information. In such instance, there is no guarantee of diversity between the calculated path and the path whose description was encrypted.

A Client Call Controller in a network practicing aspects of the present invention should be able to send a call request message responsive to receiving a call accept message for another call. Additionally, a Client Call Controller in a network practicing aspects of the present invention should be able to send a call request message responsive to receiving a call reject message related to another call.

It has been stated throughout the above that call processing messages are sent over connections that have been established over calls (in-band signaling). As will be apparent to a person skilled in the art, the network entities may communicate with one another, for instance, to exchange call processing messages, using a secondary network (out-of-band signaling). Such a secondary network is exemplified in the well-known Common Channel Signaling (i.e., CCS 7) communication scheme.

In summary, information relating to paths for established calls or paths for yet to be established calls can be included in call establishment signaling, such that the information reaches those Network Call Controllers that can use the information. Advantageously, those Call Controllers that cannot use the information, i.e., those Network Call Controllers in other networks and Client Call Controllers are barred from accessing the information by use of an encryption key that is only known within the network to which the encrypted information relates.

It should be apparent to a person skilled in the art the use of diverse paths through the various networks described herein above may allow for protection switching. That is, where a connection between Client Call Controllers is setup using a first call and a path segment in the first call experiences a fault, the connection may be set up using a previously established second call. Where the path of the second call is diverse from the path of the first call, it is unlikely that the fault in the first call will affect the operability of the second call.

Any suitable form of encryption may be used. Since the encryption occurs in the network entitled the information, conveniently, data may be encrypted with a secret key known only in the network. Which key may also be used in the network to later decrypt the data in this regard, for example, a DES encryption key may be used as the secret key.

Other modifications will be apparent to those skilled in the art and, therefore, the invention is defined in the claims.

We claim:

1. A method of, at a client call controller interfaced to a connection-oriented network, requesting the establishment of a second call from a source to a destination on the connection-oriented network, where a path for said second call uses path segments distinct from path segments used in a previously determined path for a first call on the connection-oriented network, said method comprising the steps of:

receiving a call processing message including encrypted network information at the client call controller from one of a plurality of network call controllers on the connection-oriented network; and sending a call request message to one of the plurality of network call controllers on the connection-oriented network requesting establishment of said second call, where said call request message includes said encrypted network information, wherein said first call represents an agreement to communicate over a first path through the connection-oriented network from the source to the destination, the first path being implemented on the connection-oriented network using a first series of links interconnecting the source and the destination, and wherein said second call represents an agreement to communicate over a second path through the connection-oriented network from the source to the destination different than the first path, the second path being implemented on the connection-oriented network using a second series of links interconnecting the source and the destination different than the first set of links.

2. The method of claim 1, wherein said encrypted network information comprises an identity of an end point for one of said path segments to be used in said path for said second call on the connection-oriented network.

3. The method of claim 1, wherein said encrypted network information comprises an identity of an end point for one of said path segments used in said previously determined path for said first call on the connection-oriented network.

4. The method of claim 1, wherein said message additionally includes non-encrypted network information.

5. The method of claim 4, wherein said destination is connected to a second network and said non-encrypted network information comprises an identity of an external network to network interface to said second network.

6. In a connection-oriented network including a plurality of interconnected call controllers, a client call controller comprising:
an input network interface adapted to receive a call processing message including encrypted network information about a call path of a first call on the connection-oriented network;
a processor adapted to include said encrypted network information in a call request message, said call request message requesting establishment of a second call on the connection-oriented network; and
an output network interface adapted to send said call request message to a network call controller on the connection-oriented network;
wherein said first call represents an agreement to communicate over a first path through the connection-oriented network from a source to a destination, the first path being implemented on the connection-oriented network using a first series of links interconnecting the source and the destination, and wherein said second call represents an agreement to communicate over a second path through the connection-oriented network from the source to the destination different than the first path, the second path being implemented on the connection-oriented network using a second series of links interconnecting the source and the destination different than the first set of links.

7. The client call controller of claim 6, wherein said processor is further adapted to include non-encrypted network information in said call request message.

8. The client call controller of claim 7, wherein said non-encrypted network information comprises an identity of an external network to network interface.

9. The client call controller of claim 7, wherein said non-encrypted network information comprises an identity of a network call controller on the connection-oriented network from which said call processing message was received.

10. The client call controller of claim 6, wherein said network information comprises an identity of a network.

11. The client call controller of claim 6, wherein said network information comprises an identity of an ingress call controller on the connection-oriented network.

12. In a connection-oriented network including a plurality of interconnected call controllers, a client call controller comprising:
means for receiving a call processing message, where said call processing message includes encrypted network information relevant to a first call on the connection-oriented network;
means for including said encrypted network information relevant to the first call on the connection-oriented network in a call request message, said call request message requesting establishment of a second call on the connection-oriented network; and
means for sending said call request message to a network call controller on the connection-oriented network;
wherein said first call represents an agreement to communicate over a first path through the connection-oriented network from a source to a destination, the first path being implemented on the connection-oriented network using a first series of links interconnecting the source and the destination, and wherein said second call represents an agreement to communicate over a second path through the connection-oriented network from the source to the destination different than the first path, the second path being implemented on the connection-oriented network using a second series of links interconnecting the source and the destination different than the first set of links.

13. A computer readable medium containing computer-executable instructions which, when performed by processor in a call controller in a connection-oriented network including a plurality of interconnected call controllers, cause the processor to perform the method of claim 1.

14. A method of call processing at a network call controller in a connection-oriented network including a plurality of interconnected network call controllers, the method comprising the steps of:
receiving a call request message requesting establishment of a second call to a destination over the connection-oriented network;
decrypting call path information included in said call request message relating to a first call to the destination; and
further processing said given call based on said decrypted call path information;
wherein said first call represents an agreement to communicate over a first path through the connection-oriented network from a source to the destination, the first path being implemented on the connection-oriented network using a first series of links interconnecting the source and the destination, and wherein said second call represents an agreement to communicate over a second path through the connection-oriented network from the source to the destination different than the first path, the second path being implemented on the connection-oriented network using a second series of links interconnecting the source and the destination different than the first set of links.

15. The method of claim 14 wherein said further processing comprises determining a path for said second call over the connection-oriented network.

16. In a connection-oriented network including a plurality of interconnected network call controllers, a network call controller comprising:
an input network interface adapted to receive a call request message requesting establishment of a second call to a destination over the connection-oriented network;
a processor adapted to:
decrypt call path information relating to a first call on the connection-oriented network included in said call request message; and
further process said second call based on said decrypted call path information;
wherein said first call represents an agreement to communicate over a first path through the connection-oriented network from the source to the destination, the first path being implemented on the connection-oriented network using a first series of links interconnecting the source and the destination, and wherein said second call represents an agreement to communicate over a second path through the connection-oriented network from the source to the destination different than the first path, the second path being implemented on the connection-oriented network using a second series of links interconnecting the source and the destination different than the first set of links.

17. A computer readable medium containing computer-executable instructions which, when performed by processor in a network call controller in a connection-oriented network including a plurality of interconnected network call controllers, cause the processor to perform the method of claim 14.

18. A method of using information about a first call on a connection-oriented network when requesting a second call on the connection-oriented network, the connection-oriented network including a plurality of interconnected network call controllers, the method comprising the steps of:
sending a query to one of the network call controllers on the connection-oriented network, said query requesting information about said first call on the connection-oriented network;
receiving said information in encrypted form; and
sending a call request message for said second call to one of the network call controllers on the connection-oriented network, where said call request message includes said encrypted information;
wherein said first call represents an agreement to communicate over a first path through the connection-oriented network from a source to a destination, the first path being implemented on the connection-oriented network using a first series of links interconnecting the source and the destination, and wherein said second call represents an agreement to communicate over a second path through the connection-oriented network from the source to the destination different than the first path, the second path being implemented on the connection-oriented network using a second series of links interconnecting the source and the destination different than the first set of links.

19. A client call controller connected to a connection-oriented network including a plurality of interconnected network call controllers, said client call controller comprising:
an input network interface adapted to:
send a query to one of the network call controllers on the connection-oriented
network, said query requesting information about a first call;
receive said information in encrypted form; and
send a call request message for a second call to one of the network call controllers
on the connection-oriented network;
a processor adapted to include said encrypted information in said call request message;
wherein said first call represents an agreement to communicate over a first path through the connection-oriented network from a source to a destination, the first path being implemented on the connection-oriented network using a first series of links interconnecting the source and the destination, and wherein said second call represents an agreement to communicate over a second path through the connection-oriented network from the source to the destination different than the first path, the second path being implemented on the connection-oriented network using a second series of links interconnecting the source and the destination different than the first set of links.

20. A computer readable medium containing computer-executable instructions which, when performed by processor in a client call controller connected to a connection-oriented network including a plurality of interconnected network call controllers, cause the processor to perform the method of claim 18.

21. The method of claim 1, wherein the connection-oriented network is an Automatically Switched Optical Network (ASON).

22. The method of claim 1, wherein the client call controller is dual-homed to the connection-oriented network.

23. The method of claim 1, wherein the connection-oriented network includes multiple interconnected connection-oriented networks, and wherein at least two of the interconnected connection-oriented networks are able to decrypt different portions of the encrypted network information.

24. The method of claim 1, wherein the connection-oriented network includes a first connection-oriented network portion and a second connection-oriented network portion interconnected with the first connection-oriented network portion, wherein the encrypted network information contains a first encrypted portion able to be decrypted by the first connection-oriented network portion and not the second connection-oriented network portion, and contains a second encrypted portion able to be decrypted by the second connection-oriented network portion and not the first connection-oriented network portion.

25. A method of establishing a second call related to a first call, the method comprising the steps of:
receiving a first message including encrypted information related to the first call from a first entity on a connection-oriented network; and
transmitting a second message to request establishment of the second call onto the connection-oriented network, the second message containing at least a part of the encrypted information related to the first call;
wherein said first call represents an agreement to communicate over a first path through the connection-oriented network from the source to the destination, the first path being implemented on the connection-oriented network using a first series of links interconnecting the source and the destination, and wherein said second call represents an agreement to communicate over a second path through the connection-oriented network from the source to the destination different than the first path, the second path being implemented on the connection-oriented network using a second series of links interconnecting the source and the destination different than the first set of links.

26. The method of claim 25, wherein the first entity is a first call control entity.

27. The method of claim 25, wherein the connection-oriented network comprises multiple interconnected connection-oriented network portions, and wherein the step of receiving occurs from a first entity in a first connection-oriented network portion, and wherein the step of transmitting occurs to a second entity in a second connection-oriented network portion.

28. The method of claim 25, wherein the method is performed by a client entity, and wherein the encrypted information is not able to be decrypted by the client entity.

* * * * *